United States Patent
Dietmair et al.

(10) Patent No.: US 9,843,234 B2
(45) Date of Patent: Dec. 12, 2017

(54) ELECTRIC MACHINE FOR A VEHICLE, IN PARTICULAR FOR A UTILITY VEHICLE, AND METHOD FOR PROTECTION AGAINST INGRESS OF WATER

(71) Applicant: MAN Truck & Bus AG, Munich (DE)

(72) Inventors: Andreas Dietmair, Augsburg (DE); Ulrich Harres, Nürnberg (DE)

(73) Assignee: MAN TRUCK & BUS AG, Munich (DE)

( * ) Notice: Subject to any disclaimer, the term of this patent is extended or adjusted under 35 U.S.C. 154(b) by 296 days.

(21) Appl. No.: 14/596,711

(22) Filed: Jan. 14, 2015

(65) Prior Publication Data

US 2015/0200577 A1    Jul. 16, 2015

(30) Foreign Application Priority Data

Jan. 16, 2014    (DE) .......... 10 2014 000 364

(51) Int. Cl.
*H02K 5/12*    (2006.01)
*F04B 49/06*    (2006.01)

(52) U.S. Cl.
CPC ............ *H02K 5/12* (2013.01); *F04B 49/06* (2013.01)

(58) Field of Classification Search
CPC .. H02K 5/00; H02K 5/04; H02K 5/10; H02K 5/12; F04B 49/06

USPC .................. 310/85, 88, 89, 91; 417/14
See application file for complete search history.

(56) References Cited

U.S. PATENT DOCUMENTS

| | | | | |
|---|---|---|---|---|
| 3,790,309 | A * | 2/1974 | Volz | F04C 2/165 417/368 |
| 4,347,453 | A * | 8/1982 | Gaus | H02K 5/12 310/104 |
| 4,535,583 | A * | 8/1985 | Tanaka | B67B 3/2033 192/84.3 |
| 6,203,292 | B1 * | 3/2001 | Morita | F04B 35/045 417/415 |
| 7,938,630 | B2 * | 5/2011 | Koike | F04B 39/0044 310/216.049 |
| 2002/0039539 | A1 * | 4/2002 | Tsubai | F04C 23/008 418/55.4 |
| 2004/0057247 | A1 * | 3/2004 | Kim | B60Q 1/444 362/541 |

* cited by examiner

*Primary Examiner* — Tran Nguyen
(74) *Attorney, Agent, or Firm* — Lucas & Mercanti, LLP

(57) ABSTRACT

An electric machine for a vehicle, in particular for a utility vehicle, includes a rotor mounted rotatably on a shaft and a stator surrounding the rotor, at least one device of the electric machine located in at least one pressure chamber which is subjected at least intermittently to an overpressure which is elevated with respect to the ambient pressure. The over pressure in at least one pressure chamber protects against ingress of water.

18 Claims, 1 Drawing Sheet

ELECTRIC MACHINE FOR A VEHICLE, IN PARTICULAR FOR A UTILITY VEHICLE, AND METHOD FOR PROTECTION AGAINST INGRESS OF WATER

CROSS REFERENCE TO RELATED APPLICATIONS

The present application claims priority of DE 10 2014 000 364.7, filed Jan. 16, 2014, which is incorporated herein by reference.

BACKGROUND OF THE INVENTION

The invention relates to an electric machine for a vehicle, in particular for a utility vehicle, and to a method for protection against ingress of water for an electric machine.

Electric machines installed in vehicles, in particular in utility vehicles, may be designed to be protected against splash water. Depending on the field of application of the vehicle concerned, generators or other electric machines installed in vehicles may not only be exposed to splash water but may be partially or completely surrounded by water so that, in particular, sensitive electrical devices of the electric machine concerned may be impaired or even rendered inoperative. For example, if water penetrates the region of the wiper contacts of the commutator of an electric machine, electrical contact between wiper contacts and slip rings may be temporarily or completely interrupted, causing malfunction. In addition, the penetrating water can cause corrosion damage to the devices concerned.

BRIEF SUMMARY OF THE INVENTION

An object of the invention to develop an electric machine in such a way that water-sensitive devices of the electric machine can be optimally protected against ingress of water and/or continue to function even under water.

According to an embodiment of the invention, at least one device located in the housing of the electric machine is arranged in at least one pressure chamber which is subjected, preferably intermittently, via a compressed air connection to an overpressure which is elevated with respect to the ambient pressure of the medium surrounding the electric machine. As a result of the overpressure built up in the pressure chamber, the device located therein is protected against water ingress. The electronic elements of a frequency converter, a commutator or other electronic components may be arranged in such a pressure chamber. It is especially advantageous to arrange the slip rings arranged on the rotor shaft and the wiper contacts resting against the slip rings in such a pressure chamber, since this area is especially problematic with respect to ingress of water.

In order to be pressurized, the pressure chamber concerned may be connected to a compressed air reservoir present in any case in a motor vehicle. It is also possible, however, to connect the pressure chamber to a compressor or to the overpressure side of an intake tract of an internal combustion engine. The compressed air supply for the pressure chamber therefore does not require additional devices, since devices of a motor vehicle present in any case can be used for this purpose.

In the preferred embodiment of an electric machine, the pressure chamber or pressure chambers do not need to be pressurized constantly. Rather, a control unit which controls the compressed air supply to the respective pressure chamber as a function of environmental parameters or other parameters may be provided. For example, a water sensor may detect immersion of the electric machine, so that the control unit then triggers pressurization of the pressure chambers concerned. By controlling the pressurization as a function of environmental parameters or other parameters, the ingress of water to water-sensitive devices of the electric machine is avoided in a specified manner, without the need to maintain a constant overpressure in the respective pressure chambers. However, it may also be possible to trigger the pressurization manually.

On a pressure chamber, a compressed air supply line may be connected directly to a compressed air connection. However, compressed air channels leading to one or more pressure chambers may also be arranged on the electric machine and connected to an external compressed air reservoir via a common compressed air connection. The compressed air channels arranged in the electric machine make it possible for compressed air to be supplied to a compressed air connection located remotely from the pressure chamber, independently of the spatial location of the pressure chamber concerned.

It may be especially advantageous to arrange at least one outlet opening with a small opening cross section on each pressure chamber, the opening cross section being selected such that a suitable overpressure can be built up in the pressure chamber using the existing pressure reservoir or using other pressure generators present. The outlet opening has the advantage that the pressure chamber has defined ventilation, whereby any moisture present can be removed from the pressure chamber. If the outlet opening is located in a lower drainage region of the pressure chamber, water may also flow out from the outlet opening automatically.

The electric machine according to the invention is preferably arranged in a utility vehicle suitable for deployment in water, the pressure chamber or chambers of which is/are connected to a compressed air reservoir or to a compressed air generator present in the utility vehicle, via a control unit. The utility vehicle may be, for example, an amphibious vehicle or a recovery vehicle which may be used in flooded areas. It is a further object of the invention to specify a method for improving protection against ingress of water for devices of electric machines.

This further object is achieved in that a pressure chamber in which the devices to be protected from water are located is pressurized at least intermittently. Here, the pressurization is effected as a function of environmental parameters or other operating parameters of the electric machine and/or of the vehicle in which the electric machine is arranged. Humidity data from sensors or data of a global positioning system may be used as parameters. However, a pressurization may take place, for example, every time the vehicle starts and/or stops, in order to effect removal of moisture from the pressure chamber by means of an associated ventilation function. Alternatively or additionally, manual activation is also possible.

Activation of the brakes of the vehicle may also be used as a braking parameter for pressurization; the pressurization may then be maintained for a given time period. However, the vehicle speed may also be used as a parameter in order, for example, to switch off the pressurization at relatively high vehicle speeds. It is assumed here that deployment in water does not take place at relatively high vehicle speeds.

BRIEF DESCRIPTION OF THE DRAWINGS

The invention is explained in more detail below with reference to exemplary embodiments represented in the drawing, in which.

DETAILED DESCRIPTION OF THE PREFERRED EMBODIMENTS

Figures 1, 2:
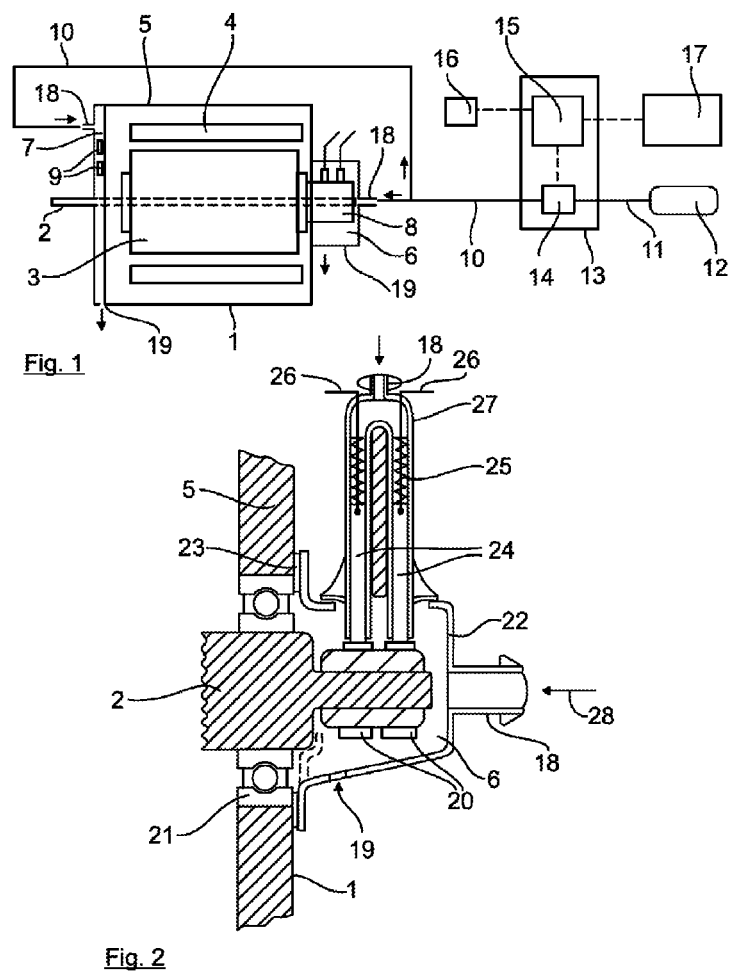
FIG. 1 is a block diagram of devices for pressurizing pressure chambers provided on an electric machine.
FIG. 2 is a partial view of an electric machine in longitudinal section in the region of a pressure chamber surrounding slip rings arranged on a rotor shaft.

The block diagram of FIG. 1 shows schematically an electric machine 1 having a rotor 3 mounted rotatably on a shaft 2 and a stator 4 surrounding the rotor 3. Two pressure chambers 6, 7, in which devices 8, 9, represented only indicatively, are located, are arranged in the housing 5 of the electric machine 1.

The two pressure chambers 6, 7 are connected to a compressed air reservoir 12 via pressure lines 10, 11. A control unit 13 with an actuator 14 and a processor 15 is located between the pressure lines 10 and 11, which processor 15 controls the actuator 14 as a function sensor data of a water sensor 16 and as a function of further parameters of an engine control unit 17. The engine control unit 17 may, for example, transmit to the processor 15 speed data of the vehicle in which the entire arrangement represented in FIG. 1 with the electric machine 1 is arranged. The engine control unit 17 may also transmit GPS data (position data) to the processor 15 as operating parameters of the vehicle. With reference to all the operating parameters and environmental parameters received, the processor 15 causes activation of the actuator 14 in order to pressurize the pressure chambers 6 and 7 intermittently with pressure from the compressed air reservoir 12. In this case the pressure chambers 6, 7 are subjected to an overpressure such that a pressure higher than the ambient pressure prevails in the pressure chambers 6, 7. This is especially important if the electric machine 1 is completely immersed in water, in order to ensure that water cannot enter the pressure chambers 6, 7.

The pressure chamber 6 contains the device 8 to be protected from water, which comprises essentially slip rings and wiper contacts, as shown in more detail in FIG. 2. A frequency converter with its electronic components may, for example, be arranged in the pressure chamber 7 as a device 9 to be protected from water; diode rectifiers, for example, may be provided in conjunction with generators.

The two pressure chambers 6, 7 have a compressed air connection 18 to which a respective pressure line 10 is connected. In addition, the two pressure chambers 6, 7 have outlet openings 19 provided in the lower region, from which compressed air as well as water can be discharged in the direction of the down-arrows marked.

In the enlarged partial view of FIG. 2, the pressure chamber 6, represented only indicatively in FIG. 1, is shown in more detail. The end of the shaft 2 of the rotor 3, on which slip rings 20 are arranged, projects into the pressure chamber 6. The shaft 2 is mounted rotatably in the housing 5 of the electric machine 1 by means of a ball bearing 21. In the region of the pressure chamber 6, the housing 5 is configured as a cover 22 which is sealed with respect to the rest of the housing 5 by means of a sealing ring 23. In addition, the compressed air connection 18 is moulded integrally on the cover 22 in the form of a connecting piece.

Wiper contacts 24, which are pressed against the slip rings 20 by means of compression springs 25, are located in the upper region of the pressure chamber 6. Electric lines 26 from the wiper contacts 24 lead out from the upwardly extended housing part 27 of the cover 22. A compressed air connection 18, via which compressed air can be fed into the pressure chamber 6 in the direction of the associated arrow, is also arranged on the upwardly oriented housing part 27.

Compressed air is also fed into the compression chamber 6 at the compressed air connection 18 projecting to the right from the cover 22 in the direction of the arrow 28 marked, so that a corresponding overpressure is produced in the pressure chamber 6.

The outlet opening 19, also shown in FIG. 1, is arranged in the lower region of the pressure chamber 6, the cross-sectional area of which outlet opening 19 is selected such that an overpressure can be built up in the pressure chamber 6 by means of the compressed air supply at the compressed air connections 18. The outlet opening 19 has a ventilation function and also a water drainage function, in case water should penetrate the pressure chamber 6, for example in switched-off mode.

It is noted that the wiper contacts 24 to be seen in the exemplary embodiment represented in FIG. 2 are in the form of rod-shaped carbon brushes. Instead of the slip rings 20, a commutator which cooperates with wiper contact elements other than the wiper contacts 24 shown here, may be arranged on the shaft 2 of the rotor, in order to establish the required electrical connection to the rotor winding of the rotor.

The pressurization according to the invention in the region of devices which are to be protected against ingress of water may also be used with brushless electrical machines and, in general, also with other electrical units or other devices to be protected from water.

LIST OF REFERENCES

1 Electric machine
2 Shaft
3 Rotor
4 Stator
5 Housing
6, 7 Pressure chamber
8, 9 Device
10, 11 Pressure lines
12 Compressed air reservoir
13 Control unit
14 Actuator
15 Processor
16 Water sensor
17 Engine control unit
18 Compressed air connection
19 Outlet opening
20 Slip rings
21 Ball bearing
22 Cover
23 Sealing ring
24 Wiper contacts

The invention claimed is:
1. An electric machine for a vehicle, comprising:
a rotor mounted rotatably on a shaft;
a stator surrounding the rotor; and
a device located in a pressure chamber,
wherein at least one of:
the pressure chamber is pressurizable with compressed air to a pressure that prevents water from entering the pressure chamber when the electric machine is fully immersed in water,
the pressure chamber is pressurized with compressed air in response to switching off a drive engine of the vehicle;

the pressure chamber is pressurized with compressed air in response to actuation of a brake of the vehicle;

the pressure chamber is pressurized with compressed air for a predetermined period of time in response to actuation of a manually actuable switching element; or data generated by a water sensor or positioning data triggers pressurization of the pressure chamber.

2. The electric machine according to claim 1, wherein the device comprises a plurality of slip rings arranged on the shaft and a plurality of wiper contacts resting against the slip rings located in the pressure chamber.

3. The electric machine according to claim 1, the pressure chamber having a compressed air connection, wherein the pressure chamber can be pressurized by the compressed air connection with compressed air from a compressed air reservoir, from a compressor, or from an intake tract of an internal combustion engine.

4. The electric machine according to claim 1, further comprising a control unit controlling a compressed air supply to the pressure chamber as a function of at least one of an environmental parameter and another parameter, the another parameter being a parameter of at least one of the electric machine and the vehicle.

5. The electric machine according to claim 1, further comprising at least one compressed air channel leading from a compressed air connection to at least one pressure chamber arranged on the electric machine.

6. The electric machine according to claim 1, wherein the pressure chamber has at least one outlet opening, wherein a cross-sectional area of the at least one outlet opening is selected such that an overpressure can be built up in the pressure chamber.

7. The electric machine according to claim 6, wherein the outlet opening is arranged as a water drainage opening and as an air discharge opening.

8. The electric machine according to claim 1, wherein the electric machine is arranged in a utility vehicle suitable for deployment in water and the pressure chamber is connected by a control unit to a compressed air reservoir or a compressed air generator present in the utility vehicle.

9. A method for protection against ingress of water for a device of the electric machine of claim 1, which is used in a vehicle, comprising the steps of:

arranging the device of the electric machine in a pressure chamber;

pressurizing the pressure chamber at least intermittently with compressed air, and wherein at least one of:

the step of pressurizing the pressure chamber is performed so that the pressure chamber is pressured with compressed air to a pressure that prevents water from entering the pressure chamber when the electric machine is fully immersed in water, the step of pressurizing is performed in response to switching off a drive engine of the vehicle;

The step of pressurizing is performed in response to actuation of a brake of the vehicle;

the step of pressurizing is performed for a predetermined period of time in response to actuation of a manually actuable switching element; or data generated by a water sensor or positioning data is monitored to trigger pressurization of the pressure chamber.

10. The method according to claim 9, wherein the step of pressurizing the pressure chamber with compressed air is performed as a function of at least one of an environmental parameter and another parameter, the another parameter being a parameter of at least one of the electric machine and the vehicle.

11. The method according to claim 9, wherein the step of pressurizing the pressure chamber with compressed air is performed in response to switching off the drive engine of the vehicle.

12. The method according to claim 9, wherein the step of pressurizing the pressure chamber with compressed air is performed in response to actuation of the brake of the vehicle.

13. The method according to claim 9, wherein the step of pressurizing the pressure chamber with compressed air is triggered by a manually actuable switching element and is performed for a predetermined time period.

14. The method according to claim 9, wherein the step of pressurizing the pressure chamber with compressed air is performed in response to at least one of data generated by a water sensor, positioning data, and a parameter of one of the electric machine and the vehicle.

15. A vehicle having an electric machine according to claim 1.

16. The vehicle of claim 15, wherein the vehicle is a utility vehicle.

17. The electric machine of claim 1, wherein the electric machine is for a utility vehicle.

18. A vehicle with an electric machine, the electric machine including
a rotor mounted rotatably on a shaft;
a stator surrounding the rotor; and
a device located in a pressure chamber, the pressure chamber having a compressed air connection, wherein the pressure chamber can be pressurized by the compressed air connection with compressed air from a compressed air reservoir, from a compressor, or from an intake tract of an internal combustion engine.

* * * * *